United States Patent [19]
Ejima et al.

[11] Patent Number: 4,794,955
[45] Date of Patent: Jan. 3, 1989

[54] HOSE FOR AND METHOD OF ATTENUATING FLUID PRESSURE PULSATIONS

[75] Inventors: Kikuo Ejima, Hiratsuka; Hisao Amamiya, Yokohama, both of Japan

[73] Assignee: Kabushiki Kaisha Komatsu Seisakusho, Tokyo, Japan

[21] Appl. No.: 61,519

[22] Filed: Jun. 15, 1987

[30] Foreign Application Priority Data

Jun. 16, 1986 [JP] Japan .................. 61-138333

[51] Int. Cl.$^4$ ............ F16L 55/04; F15D 1/02; F17D 1/20
[52] U.S. Cl. .................................... 138/30
[58] Field of Search ..................... 138/26, 30

[56] References Cited
U.S. PATENT DOCUMENTS
3,323,305 6/1967 Klees ................. 138/26 X Primary Examiner—Werner H. Schroeder
Attorney, Agent, or Firm—Armstrong, Nikaido, Marmelstein & Nikaido

[57] ABSTRACT

In a fluid periodic pressure wave motion attenuating hose in which an inner tube thereof serving as a main conduit portion is coaxially mounted in the hose so as to form an annular space portion between an inner peripheral surface of the hose and an outer peripheral surface of the inner tube, which annular space portion serves as a side-branch portion and is partially communicated with the above main conduit portion of the hose at a predetermined position, the opposite end portions of the inner tube are fixed to a pair of couplings connected with opposite fluid ducts so as to positively define the above side-branch portion against the main conduit portion of the hose and so as to surely support the inner tube. In addition, the inner tube may be constructed of a wire-like spring member and a strip-like metallic member both coiled together to axially alternate in parallel to each other in a close-contact manner, while relaxed in its close-contact at the above predetermined position.

6 Claims, 2 Drawing Sheets

HOSE FOR AND METHOD OF ATTENUATING FLUID PRESSURE PULSATIONS

BACKGROUND OF THE INVENTION

1. Field of the Invention

The present invention relates to a hose for transmitting a fluid under pressure, and more particularly to a hose for and a method of attenuating a fluid pressure pulsations produced in a pressurized-oil piping, a gas piping and like pipings employed in construction equipments, construction vehicles and further industrial machines.

2. Description of the Prior Art

In case that a liquid such as oil and water or a gas such as air and the like is transmitted under pressure through pipes, such fluid is generally transmitted together with its periodic pressure pulsations which cause objectionable vibrations in the pipes. These vibrations propagate throughout the entire piping of the pipes to produce a noise, and further, at worst, to cause breakage of at least a part of the piping.

In order to prevent such noise and breakage from occurring, hitherto employed are a fluid wave motion attenuating device of a so-called quincke-filter type and that of a so-called quarter-wave side-branch type as shown in FIGS. 1 and 2 of U.S. Pat. No 3,323,305, respectively. In any of the above conventional devices, a main conduit portion thereof is coupled with a side-branch portion in the fluid in which is produced a different-phase pressure wave being out of phase with respect to a pressure wave passing through the fluid in the main conduit portion, so as to make these pressure waves interfere with each other to attenuate the periodic pressure pulsations of the fluid in the main conduit portion of the device.

However, in any of these conventional attenuating devices, since the side-branch portion is coupled with the main conduit portion in a close-ended branching manner, the device is excessively large in size. In addition, in case that one of the conventional attenuating devices is provided with a main conduit portion in the fluid in which, for example, a pressure wave having a frequency of 300 Hz is produced, such main conduit portion must be coupled with a side-branch portion having a length of approximately 1 m to conduct an effective attenuation of the pressure wave of the fluid, a top-end part of which side-branch portion must be, therefore, fixed to a certain mount body. As a result, the objectionable vibrations are transmitted from the top-end part of the side-branch portion of the attenuating device to such certain mount body. These are defects inherent in the conventional devices.

In order to resolve these problems inherent in the conventional fluid pressure wave attenuating devices, the above U.S. Pat. No. 3,323,305 further discloses improvements in the fluid pressure wave interference type attenuating devices of both of the quincke-filter type and the quarter-wave side-branch type, as shown in FIGS. 6 and 7 thereof, respectively. In these improved conventional devices, the side-branch portion is coaxially mounted on an outer periphery of the main conduit portion thereof to make it possible to construct the devices in an appearance-refining manner and a size-saving manner.

However, in these improvement of the conventional devices, since the side-branch portion is connected with the main conduit portion thereof in a loose manner while not positively defined against the latter, there is a problem in that an appropriate phase difference is not necessarily produced between a periodic pressure wave produced in the fluid in the side-branch portion and that produced in the fluid in the main conduit portion to make it impossible to cause an effective interference between these fluid periodic pressure waves.

SUMMARY OF THE INVENTION

In view of the above problems of the prior art, the present invention is made.

It is an object of the present invention to provide a fluid pressure wave motion attenuating hose for producing a desired phase difference between a periodic pressure wave produced in a fluid in a side-branch portion of the hose and that produced in a fluid in a main conduit portion thereof so as to effectively attenuate the motion of the periodic pressure wave in the fluid in the main conduit portion, in which hose the side-branch portion is positively defined against the main conduit portion and supported thereby so as to enable them to be effectively communicated.

It is another object of the present invention to provide a method for easily manufacturing at a low cost a fluid pressure wave motion attenuating hose which may very effectively attenuate the periodic pressure wave motion of a fluid in the hose.

The above objects of the present invention are accomplished by the following fluid pressure wave motion attenuating hose: namely, In a fluid pressure wave motion attenuating hose comprising: a hose fixed at its opposite end portions to opposite ducts through a pair of couplings each of which is fixed to each of the end portions of the hose by means of a crimp hose-fitting; and a flexible inner tube coaxially mounted in the hose so as to form an annular space inside the hose, the improvement wherein: the inner tube is surely fixed at its opposite end portions to a pair of the couplings; and, in the vicinity of one of the end portions of the pair of the couplings, the interior portion of the inner tube, which portion serves as a main conduit portion of the hose, is communicated with the annular space serving as a side-branch portion of the hose through a pulsation-absorption aperture provided in the inner tube.

Further, in the fluid pressure wave motion attenuating hose of the present invention, the inner tube may be constructed of a wire-type spring member and a strip-type metallic member both of which are coiled together in parallel so as to alternate with each other in a close-contact manner.

Still further, according to the present invention, there is provided the following method: namely, In a method for manufacturing a fluid pressure wave motion attenuating hose comprising the steps of: fixing each of opposite end portions of the hose to an outer peripheral portion of each of a pair of couplings through a crimp hose-fitting, which couplings are connected to opposite ducts; and mounting a flexible inner tube coaxially in the hose so as to form an annular space inside the hose, the improvement which comprises: constructing the inner tube by coiling both a wire-like member and a strip-like member together so as to axially alternate these member in a close-contact manner in parallel to each other; and relaxing the close-contact established between the wire-like member and the strip-like member at a position in the vicinity of one of the end portions of the inner tube so as to form, at the above position, a fluid pulsation-absorption aperture for communicating an interior portion of the inner tube with the annular space serving as a side-branch portion of the hose, which interior portion of the inner tube serves as a main conduit portion of the hose.

The above and many other advantages, features and additional objects of the present invention will become manifest to those versed in the art upon making reference to the following detailed description and accompanying drawings in which preferred structural embodiments incorporating the principles of the present invention are shown by way of illustrative examples.

DESCRIPTION OF THE PREFERRED EMBODIMENTS

Figure 1:
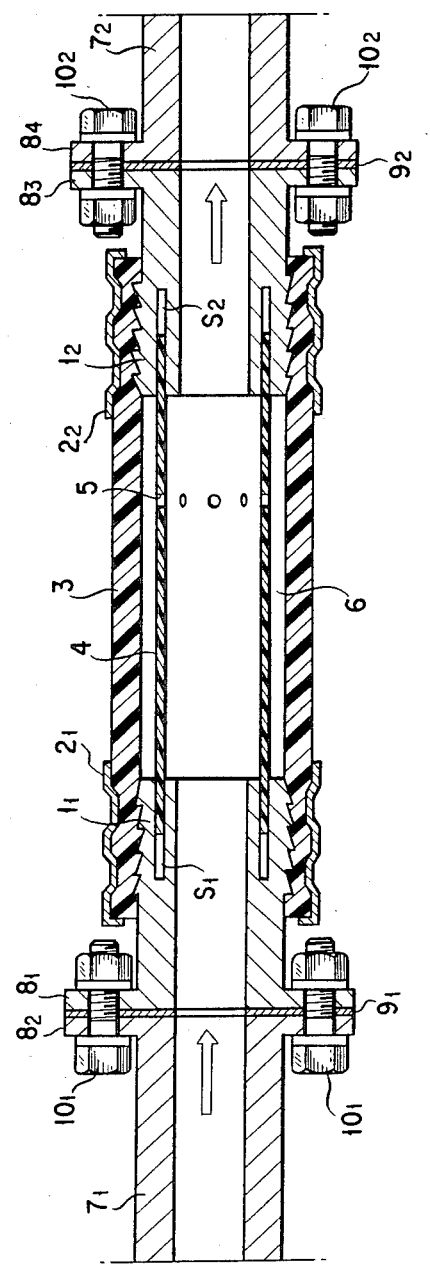
FIG. 1 is a longitudinal sectional view of an embodiment of a fluid pressure wave motion attenuating hose of the present invention.

With reference to FIG. 1, hereinbelow will be described in detail a first embodiment of a fluid pressure wave motion attenuating hose of the present invention.

As shown in FIG. 1: the reference numerals $1_1$ and $1_2$ denote a pair of couplings; $2_1$ and $2_2$ crimp hose-fittings; 3 a hose; and 4 a flexible inner tube made of a flexible material such as rubber, nylon, polyester and the like.

Opposite end portions of the flexible inner tube 4 are inserted into annular grooves $S_1$ and $S_2$ formed in inside end surfaces of the couplings $1_1$ and $1_2$ respectively so that the flexible inner tube 4 is surely connected with the pair of the couplings $1_1$ and $1_2$.

On the other hand, the hose 3 is connected at its opposite end portions to outer peripheral portions of the end portions of the couplings $1_1$ and $1_2$ by means of the crimp hose-fittings $2_1$ and $2_2$ as shown in FIG. 1, so as to encircle these outer peripheral portions of the end portions of the couplings $1_1$ and $1_2$. A plurality of through-holes or pulsation-absorption apertures 5 are formed in a portion of the flexible inner tube 4 at positions in the vicinity of a downstream side of the flexible inner tube 4 as shown in FIG. 1 in which a fluid flows in the direction of the arrow. An annular space portion 6 is formed between an inner peripheral surface of the hose 3 and an outer peripheral surface of the flexible inner tube 4 serving as a side-branch portion of the hose, in which space portion 6 is received the fluid. Such annular space portion 6 is substantially equal in cross sectional area to the flexible inner tube 4.

Incidentally, in FIG. 1, the reference numeral $7_1$ denotes a fluid duct a flange portion $8_2$ of which is abutted on a flange portion $8_1$ of the coupling $1_1$ through a sealing member $9_1$ and firmly connected thereto by fastening a bolt $10_1$ so that the fluid duct $7_1$ is firmly connected to the coupling $1_1$. As shown in FIG. 1, another fluid duct $7_2$ has the substantially same construction as that of the fluid duct $7_1$. Namely, a flange portion $8_4$ of the fluid duct $7_2$ is abutted on a flange portion $8_3$ of the coupling $1_2$ through another sealing member $9_2$ and firmly connected thereto by fastening another bolt $10_2$ so that the fluid duct $7_2$ is firmly connected to the coupling $1_2$.

The fluid flowing in the direction of the arrow shown in FIG. 1 passes through the coupling $1_1$ to enter the interior of the flexible inner tube 4 so that the hose 3 is filled with the fluid, and then the fluid exits into the fluid duct $7_2$ from the interior of the coupling $1_2$.

In this case, a periodic pressure wave formed in the fluid passing through the interior of the flexible inner tube 4 differs in phase by an amount of substantially 180° from that formed in the fluid existing in the annular space portion 6 at the positions of the pulsation-absorption apertures 5, so that these periodic pressure waves interfere with each other to be completely attenuated.

In the first embodiment of the present invention having the above construction, several experiments were conducted with the use of a fluid such as water, oil and air, and obtained the following results:

In the construction of the hose of the present invention, since the opposite end portions of the flexible inner tube 4 are surely connected to the couplings $1_1$, $1_2$ so as to hold the flexible inner tube 4 stationary in a radial direction of the tube 4, it is possible to obtain a very steady flow of the fluid in the interior of the flexible inner tube 4. In addition, since the annular space portion 6 serving as the side-branch portion of the hose 3 is always kept constant in its configuration, it is possible to obtain a stable interference of the periodic pressure waves of the fluid at the positions of the pulsation-absorption apertures 5 of the flexible inner tube 4. As a result, in any of the fluids, i.e., water, oil and air, it is possible to obtain an effective interference of the periodic pressure waves of the fluid, which leads to a good attenuation of the periodic pressure wave of the fluid.

Figure 2:
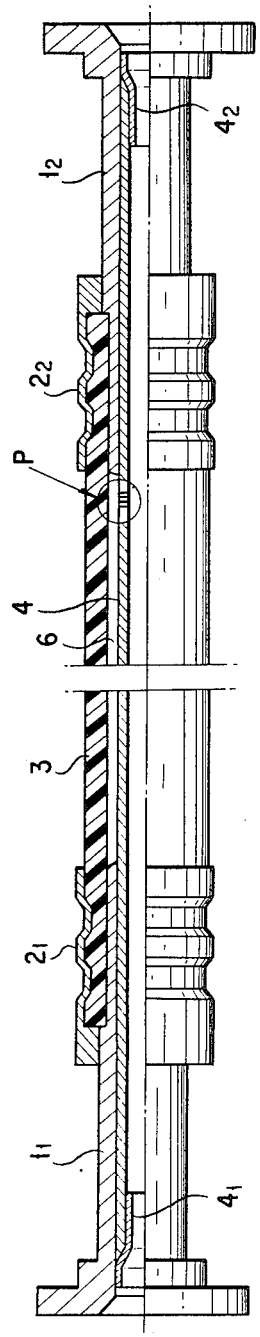
FIG. 2 is a longitudinal sectional view of another embodiment of the fluid pressure wave motion attenuating hose of the present invention.

With reference to FIG. 2, a second embodiment of the present invention will be hereinbelow described in detail. Incidentally, like reference numerals identify like parts throughout the drawings to eliminate redundancy in description.

In the second embodiment of the present invention shown in FIG. 2, the opposite end portions of the flexible inner tube 4 are fixed to inner peripheral surfaces of the pair of the opposite couplings $1_1$ and $1_2$ through a pair of sleeves $4_1$ and $4_2$, respectively.

Figure 3:
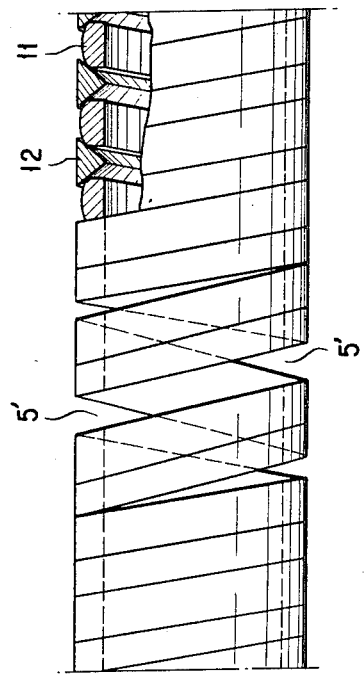
FIG. 3 is a partially enlarged and partially broken view of an essential part of the another embodiment shown in FIG. 2, indicated by the reference character "P".

In addition, as shown in FIG. 3, the flexible inner tube 4 may be constructed of a wire-like spring member 11 and a strip-like metallic member 12 both of which are coiled together so as to axially alternate in parallel to each other in a close-contact manner. In the vicinity of one of end portions of the annular space portion 6 which is formed between the hose 3 and the flexible inner tube 4 to serve as the side-branch portion of the hose 3, or in the vicinity of the inside end portion of the coupling $1_2$ in this embodiment shown in FIG. 2, there is formed the pulsation-absorption aperture 5' by loosening the above close-contact established between the wire-like spring member 11 and the strip-like metallic member 12.

Since this second embodiment of the hose 3 of the present invention shown in FIG. 2 is substantially the same in action and effect as the first embodiment of the hose 3 of the present invention shown in FIG. 1, the description of the second embodiment of the present invention as to its action and effect is neglected to eliminate redundancy in description.

The second embodiment of the present invention shown in FIG. 2 has an additional advantage in that the pulsation-absorption aperture 5' may be very easily formed at a low cost without boring the wall of the flexible inner tube 4.

Incidentally, in both of the first and the second embodiments of the present invention, the annular space 6 serving as the side-branch portion of the hose 3 has an axial length equal to a quarter wave-length of the fluid periodic pressure wave to be attenuated, so that the periodic pressure wave of the fluid issued from the annular space portion 6 into the interior portion of the flexible inner tube 4 through the pulsation-absorption apertures 5 or aperture 5' differs in phase from that of the fluid directly passing through the interior portion of the flexible inner tube 4 by an amount of substantially 180°, which leads to a substantially complete attenuation of the periodic pressure wave of the fluid directly passing through the interior portion of the flexible inner tube 4 of the hose 3 of the present invention.

What is claimed is:

1. A fluid pressure wave motion attenuating device for transmitting a fluid under pressure between a pair of oppositely disposed fluid ducts comprising: a pair of couplings, a hose adapted to be fixed at its opposite end portions to said ducts through said pair of couplings with each of said couplings fixed to one of said end portions of said hose by means of a crimp hose-fitting, a flexible inner tube coaxially mounted in said hose to form a main conduit internally of said inner tube and an annular space between said hose and said inner tube, said inner tube being fixed at its opposite end portions to said pair of couplings and an aperture through said flexible inner tube in the vicinity of an end portion of one of said couplings and providing fluid communication between said main conduit and said annular space between said hose and said inner tube, whereby said annular space serves as a fluid pulsation-absorption side-branch of said device.

2. A fluid pressure wave motion attenuating device as set forth in claim 1, wherein: said inner tube is constructed of a wire-like spring member and a strip-like metallic member both coiled together so as to axially alternate in parallel in a close-contact manner.

3. A fluid pressure wave motion attenuating device as set forth in claim 1, wherein: each of said couplings has a annular groove formed in an end surface thereof and opposite end portions of said flexible inner tube are inserted into said annular grooves formed in said end surfaces of said pair of said couplings.

4. A fluid pressure wave motion attenuating device as set forth in claim 2, wherein: each of said couplings has an inner peripheral surface and the opposite end portions of said inner tube are each fixed to one of said inner peripheral surfaces of said pair of said couplings by a sleeve.

5. A method of manufacturing a tubular fluid pressure wave motion attenuating device having a coupling with an interior bore at each end thereof comprising:
   providing a hose,
   providing a flexible inner tube by coiling both a wire-like member and a strip-like member together so as to axially alternate said wire-like and strip-like members in a close-contact condition in parallel to each other, relaxing said close-contact established between said wire-like member and said strip-like member to provide an aperture therethrough at a portion in the vicinity of one end portion of said flexible inner tube,
   securing each of the opposite ends of said hose to an outer peripheral portion of respective ones of a pair of couplings,
   securing each of the opposite ends of said flexible inner tube to respective ones of said pair of couplings with the exterior of said flexible inner tube and the interior of said hose defining an annular space, the interior of said flexible inner tube providing a main fluid conduit portion of said device and said aperture providing fluid communication between said main fluid conduit portion of said device and said annular space which serves as a fluid pulsation-absorption, side-branch of said device.

6. A method of manufacturing a tubular fluid pressure wave motion attenuating device as set forth in claim 5 wherein the opposite ends of said hose are secured to said couplings by respective ones of a pair of fittings crimped to said couplings and the opposite ends of said flexible inner tube are secured to the interior bores of said couplings.

* * * * *